United States Patent [19]

St. Clair et al.

[11] Patent Number: 4,552,931

[45] Date of Patent: * Nov. 12, 1985

[54] PROCESS OF END-CAPPING A POLYIMIDE SYSTEM

[75] Inventors: Terry L. St. Clair, Poquoson; Harold D. Burks, Newport News, both of Va.

[73] Assignee: The United States of America as represented by the Administrator of the National Aeronautics and Space Administration, Washington, D.C.

[*] Notice: The portion of the term of this patent subsequent to Apr. 24, 2001 has been disclaimed.

[21] Appl. No.: 649,328

[22] Filed: Sep. 11, 1984

[51] Int. Cl.$^4$ .............................................. C08G 73/10
[52] U.S. Cl. ........................................ 525/432; 525/436; 528/179; 528/182; 528/185; 528/352; 528/353
[58] Field of Search ............... 528/185, 352, 353, 179, 528/182; 525/432, 436

[56] References Cited

U.S. PATENT DOCUMENTS

| | | | |
|---|---|---|---|
| 3,179,630 | 4/1965 | Endrey | 260/78 |
| 3,179,632 | 4/1965 | Hendrix | 260/78 |
| 3,234,181 | 8/1966 | Oliver | 260/47 |
| 3,943,107 | 3/1976 | Seltzer et al. | 260/65 |
| 3,998,786 | 12/1976 | D'Alelio | 260/47 |
| 4,417,044 | 11/1983 | Parekh | 528/185 |
| 4,429,102 | 1/1984 | Evans et al. | 528/185 |
| 4,443,591 | 4/1984 | Schmidt et al. | 528/185 |
| 4,444,979 | 4/1984 | St. Clair et al. | 528/185 |

Primary Examiner—Lester L. Lee
Attorney, Agent, or Firm—Howard J. Osborn; Wallace J. Nelson; John R. Manning

[57] ABSTRACT

A process of endcapping a polyimide system with an endcapping agent in order to achieve a controlled decrease in molecular weight and melt viscosity along with predictable fracture resistance of the molded products is disclosed. The uncapped system is formed by combining an equimolar ratio of 4,4'-bis(3,4-dicarboxyphenoxy) diphenylsulfide dianhydride (BDSDA) and 1,3-bis(aminophenoxy)benzene (APB) dissolved in bis(2-methoxyethyl)ether. The endcapped system is formed by dissolving APB in bis-(2-methoxyethyl)ether, adding the endcapping agent, and then adding the BDSDA. By varying the amount of endcapping from 0 to 4%, molecular weight is decreased from 13,900 to 8660. At a processing temperature of 250° C., there is a linear relationship between molecular weight and viscosity, with the viscosity decreasing by two orders of magnitude as the molecular weight decreased from 13,900 to 8660. A greater drop in viscosity is noted at higher temperatures. Apparent viscosity as a function of molecular weight at 250° C. and at 280° C. is depicted in FIG. 2. Reducing the molecular weight also results in a linear decrease in the fracture resistance from 4100 J/m$^2$ to 296 J/m$^2$, as shown in FIG. 1.

7 Claims, 2 Drawing Figures

PROCESS OF END-CAPPING A POLYIMIDE SYSTEM

ORIGIN OF THE INVENTION

The invention described herein was made by employees of the U.S. Government and may be used by or for the Government for governmental purposes without the payment of any royalties thereon or therefor.

BACKGROUND OF THE INVENTION

Polyimides are a class of polymers that have proved useful in aeronautical and space applications through molding, calendering and injection molding. Linear aromatic polyimides, although not processable via conventional thermoplastic or hot-melt techniques, are exceptionally thermally stable, have a high glass transition temperature, and are resistant to attack by common organic solvents. Linear aromatic polyphenylene oxides and sulfides, on the other hand, are more easily processed than polyimides, exhibit lower glass transition temperatures, have good thermal stability although not equal to polyimides, and do not have the solvent resistance of polyimides. In the present invention a novel polymer has been synthesized that combines the favorable properties of both polyimides and polyphenylene oxides and sulfides. The new system can now be processed using conventional thermoplastic techniques. In order to maximize use properties and processability, molecular weight was varied by varying the amount of endcapping with a monoanhydride. The effect of endcapping is to decrease both molecular weight and apparent viscosity, the latter decreasing by two orders or magnitude at a processing temperature of 250° C. and three orders of magnitude at a processing temperature of 280° C.

Accordingly, an object of the present invention is to provide a process for making a polyimide that is processable via conventional thermoplastic or hot-melt techniques.

Another object of the present invention is to provide a process for endcapping a polyimide system with a monoanhydride.

Another object of the present invention is to provide a process for controlling molecular weight and apparent viscosity of a polyimide at different temperatures.

A further object of the invention is to maximize flow characteristics for a molecular weight material with the desired fracture resistance by establishing the relationship between the amount of endcapping, molecular weight, and fracture resistance.

BRIEF SUMMARY OF THE INVENTION

According to the present invention, the foregoing and other objects are attained by endcapping a novel linear polyphenylene ether sulfide-imide (BDSDA/APB) with phthalic anhydride as the endcapping agent. As the amount of endcapping is varied from 0 to 4%, molecular weight decreased from 13,900 to 8660. There was also a decrease in apparent viscosity. At 250° C., the viscosity decreased linearly from about $10^6$ Pa-sec to less than $10^4$ Pa-sec. At higher temperatures there was a greater decrease in viscosity—three orders of magnitude at 280° C. (See FIG. 2). Increasing the amount of endcapping from 0 to 4% also resulted in a linear decrease in fracture resistance from 4100 J/m$^2$ to 296 J/m$^2$ (See FIG. 1).

DETAILED DESCRIPTION OF THE INVENTION

An uncapped polyimide, BDSDA/APB, was formed by combining an equimolar ratio of 4,4'-bis(3,4-dicarboxyphenoxy)diphenylsulfide dianhydride (BDSDA) and 1,3-bis-(aminophenoxy)benzene (APB) dissolved in bis(2-methoxyethyl)ether at a 15% solids level. The chemical structure of BDSDA/APB, the uncapped polyimide, is shown below:

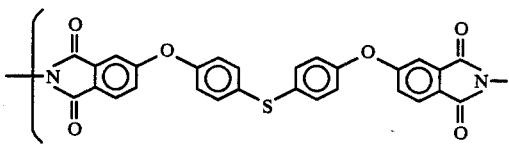

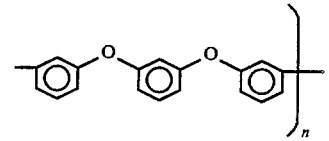

The endcapped system is formed by mixing APB dissolved in bis(2-methoxyethyl)ether with an endcapping agent, e.g., phthalic anhydride. The structure of the endcapped polymer is as follows:

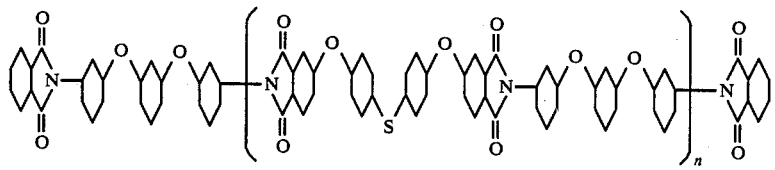

where n=5–100.

The endcapping agent can be any monoanhydride of the general type

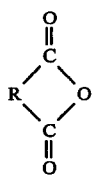

where R is any alkyl moiety, or

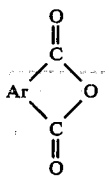

where Ar is any aryl moiety,
or a monofunctional amine of the general type R—NH$_2$ where R is any alkyl moiety, or Ar—NH$_2$ where Ar is any aryl moiety.

Figure 1:
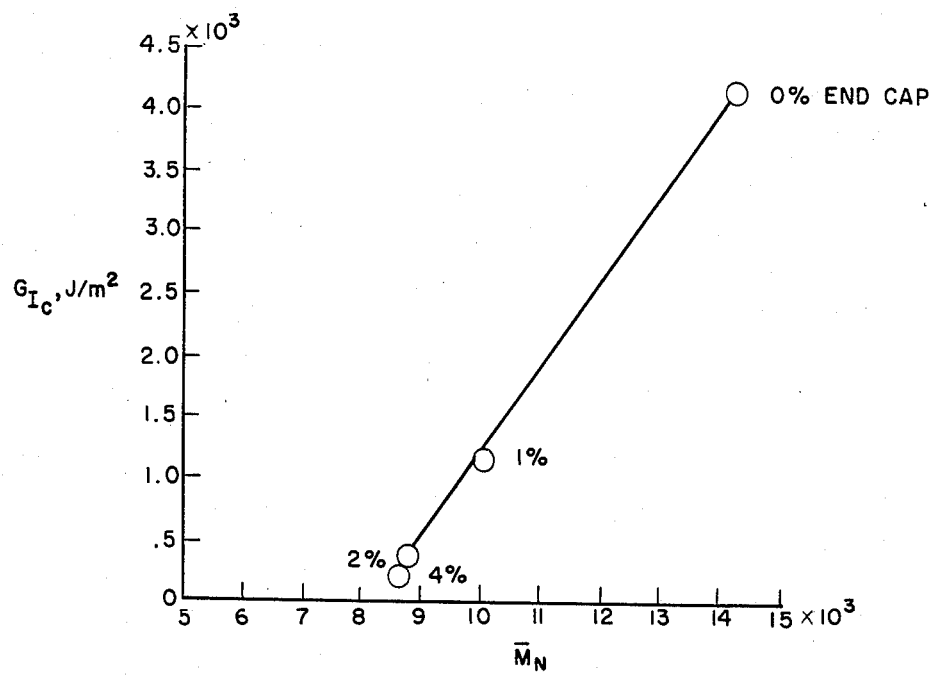
FIG. 1 is a graph of the fracture energy ($G_{Ic}$) as a function of the molecular weight ($\overline{M}_n$) for the BDSDA/APB system of the present invention.
Figure 2:
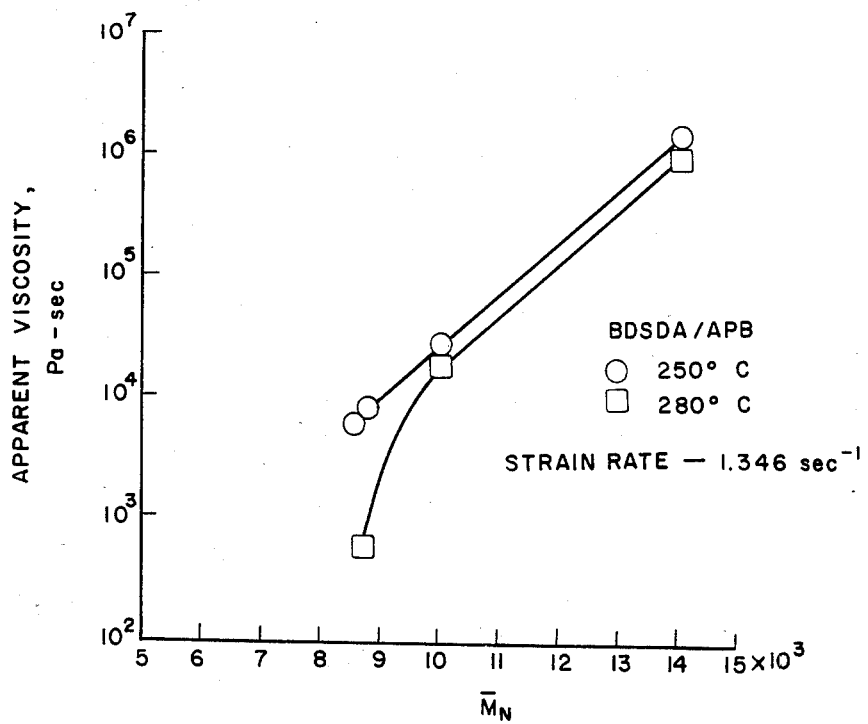
FIG. 2 is a graph of the apparent viscosity as a function of molecular weight ($\overline{M}_n$) at 250° C. and 280° C. for the BDSDA/APB system.

By varying the amount of endcapping from 0 to 4%, the molecular weight decreased from 13,900 to 8660, while at a processing temperature of 250° C., the apparent viscosity was linearly decreased from about 10$^6$ Pa-sec to less than 10$^4$ Pa-sec. There were larger decreases in apparent viscosity at higher temperatures as shown in FIG. 2. While increasing the amount of endcapping from 0 to 4%, fracture resistance also linearly decreased, from 4100 J/m$^2$ to 296 J/m$^2$ (See FIG. 1).

SPECIFIC EXAMPLES

EXAMPLE I

Preparation of the Uncapped Polymer

The uncapped polymer was formed by dissolving 1.000 mole of 4,4'-bis(3,4-dicarboxyphenoxy)diphenyl-sulfide dianhydride (BDSDA) and 1.000 mole of 1,3-bis(aminophenoxy)benzene (APB) in bis(2-methoxyethyl)ether (known as diglyme) at a 15% solids level in a flask equipped with magnetic stirring. The solution was stirred for one hour to build molecular weight.

EXAMPLE II

Preparation of the Endcapped System

The endcapped system was prepared by dissolving APB in bis(2-methoxyethyl)ether. Adding phthalic anhydride (PA) and stirring the system for 15 minutes. BDSDA was added and the system was stirred for one hour to allow molecular weight to build. The ratios of reactants used for the different endcapped systems are shown in Table I.

TABLE I

| Endcapping System | APB, moles | BDSDA, moles | PA, moles |
|---|---|---|---|
| 1% | 1.000 | 0.995 | 0.010 |
| 2% | 1.000 | 0.990 | 0.020 |
| 4% | 1.000 | 0.980 | 0.040 |

Note that since BDSDA is difunctional, a decrease of one percent of BDSDA must be offset with a concomitant increase of two percent in PA which is monofunctional.

EXAMPLE III

Preparation of Molding Power

The polymer solution was poured into a mechanical blender containing distilled water causing the polyamide-acid to precipitate. The rotating blender blades chopped this material into a fluffy consistency. Suction filtration isolated the solid polymer which was then air dried overnight. The dried polymer was spread in a baking dish, placed in a forced-air oven and heated to 100° C. The polymer was held at this temperature for one hour to drive off any residual water and solvent. The oven temperature was then increased to 200° C. and held there for one hour to convert the amide-acid to imide.

EXAMPLE IV

Preparation of Molding

The imidized powder was placed in a matched-metal molding die which had previously been preheated to 160° C. Consolidation was effected by applying a pressure of 1.38–2.07 MPa (200–300 psi). After maintaining the above temperature and pressure for one-half hour, the mold was cooled to approximately 100° C. and the molding was removed. When prepared in discs up to 0.635 cm in thickness, the resultant molding was light brown and transparent.

EXAMPLE V

Rheology

A capillary rheometer (Instron Model 3211) was used to determine melt flow properties at both 250° C. and 280° C. Because the capillary had a sufficiently large length-to-diameter ratio of 33, there was no need to correct for wall drag. Thus, no end corrections were required.

EXAMPLE VI

Mechanical Testing

The fracture energy values (G$_{Ic}$), the opening mode strain energy release rates, were determined for each system. Each sample was machined from a disc 5.715 cm diameter, nominally 0.127 cm thick, precracked and run at a crosshead speed of 0.127 cm/min according to ASTM Standard E 399-78A. The results are depicted in FIG. 1.

EXAMPLE VII

Molecular Weight

The number average molecular weight ($\overline{M}_n$) was determined at room temperature for the polyamide-acid dissolved in tetrahydrofuran using a Knauer Membrane Osmometer.

EXAMPLE VIII

Apparent Viscosity

The apparent viscosity was calculated by dividing the flow stress by the strain rate, both of which are measured using a capillary rheometer. The strain rate was not corrected to obtain the wall rate. Therefore, the viscosity is an apparent rather than a true viscosity.

It is thus seen that the foregoing Examples are illustrative of a novel approach of endcapping a polyimide system to control molecular weight, melt viscosity and fracture resistance.

Although the invention has been described relative to a specific polyimide system (BDSDA/APB) and a specific end-capping agent (phthalic anhydride), other suitable polymer systems exist, and are considered within the scope of the invention.

The specific Examples described herein are to merely illustrate the invention and are not to be deemed as exhaustive. Thus, various modifications and variations of the present invention will be apparent to those skilled in the art without departing from the spirit and scope of the appended claims.

What is claimed as new and desired to be secured by Letters Patent of the United States is:

1. A process of endcapping a polyimide system having the uncapped chemical structure of

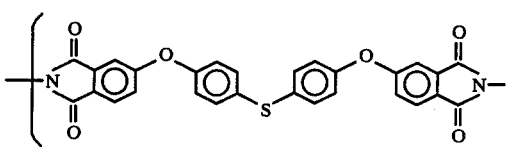

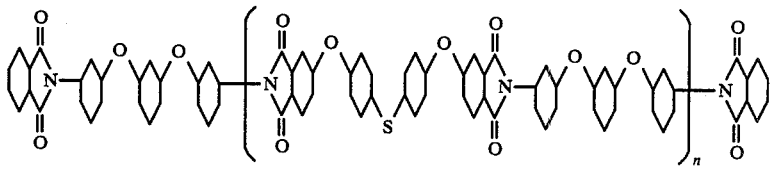

where n=5-100
comprising reacting an endcapping agent with the uncapped polyimide system for a controlled period of time and wherein the endcapping agent is selected from the group consisting of:

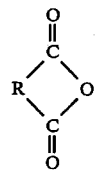

where R is any alkyl moiety,

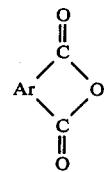

where Ar is any aryl moiety,
a monofunctional amine of the general type R—NH$_2$
where R is any alkyl moiety, and Ar—NH$_2$
where Ar is any aryl moiety.

2. The process of claim 1 wherein the specific endcapping agent is phthalic anhydride.

3. The process of claim 1 wherein the endcapped system is formed by dissolving 1,3-bis-(aminophenoxy)-benzene (APB) in bis(2-methoxyethyl)ether, adding the endcapping agent, stirring for 15 minutes, and then adding 4,4'-bis-(3,4 dicarboxyphenoxy)diphenylsulfide (BDSDA) and stirring for one hour to yield a resultant endcapped system having the formula of:

where n=5-100.

4. The process of claim 1 wherein the molecular weight is lowered from 13,900 to 8660, with a concomitant decrease in melt viscosity, by endcapping the system with varying amounts of phthalic anhydride from 1-4%.

5. The process of claim 4 wherein there is a linear relationship between molecular weight and apparent viscosity with the 13,900 system having a viscosity of about $10^6$ Pa-sec and the 8660 system with a viscosity of less than $10^4$ Pa-sec at a processing temperature of 250° C.

6. The process of claim 5 wherein there is a greater drop in viscosity at temperatures above 250° C.; at 280° C., the loss is more than three orders of magnitude.

7. The process of claim 4 wherein an increase in endcapping from 1-4%, while decreasing molecular weight from 13,900 to 8660, also results in a linear decrease in fracture resistance from 4100 J/m$^2$ to 296 J/m$^2$ thus permitting maximization of flow characteristics for a molecular weight material with the desired fracture resistance.

* * * * *